April 1, 1969  E. B. ACKERMAN  3,436,315
SOLAR HEATED COLUMN STILL
Filed Nov. 23, 1966

INVENTOR,
ERNEST B. ACKERMAN

United States Patent Office 3,436,315
Patented Apr. 1, 1969

3,436,315
SOLAR HEATED COLUMN STILL
Ernest B. Ackerman, Denver, Colo., assignor to Spectra International, Inc., Cheyenne, Wyo., a corporation of Wyoming
Filed Nov. 23, 1966, Ser. No. 596,689
Int. Cl. C02b *1/06;* B01d *3/32*
U.S. Cl. 202—153                                    4 Claims

ABSTRACT OF THE DISCLOSURE

An apparatus for recovering fresh water from saline water is described comprising a closed container adapted to be heated by solar energy, the top portion having a centrally located entry passage for saline water and a plurality of circumferentially spaced vapor exhaust tubes having a downwardly disposed expanded section communicating with the top portion, a base portion having a water exit passage and a plurality of porous replicated metal plates interlocked by suitable means to form the outer wall of the apparatus. The apparatus provides a large surface area for retaining saline water and forms a tortuous path for the flow of water from said entry passage to said exit passage.

---

This invention relates to the recovery of usable, fresh water from sea or brackish water. More particularly, the invention embraces an apparatus or device for producing clear, fresh water from saline water utilizing a distillation principle and relying primarily upon solar energy.

In recent years, the expanding population and centralization of large masses of people in select areas of the world, as well as the depletion and pollution of natural water reservoirs, has emphasized the criticality of obtaining additional supplies of fresh water. One source always considered is the recovery of fresh water from sea water. However, although numerous plans and devices have been suggested, including the use of distillation processes, all have shortcomings usually from the standpoint of cost.

Accordingly, it is a primary object of the present invention to provide a method for the recovery of clear, fresh water from sea or brackish water which method can be conventionally practiced.

It is another object of this invention to provide a method of recovering clear, fresh water from sea or brackish water utilizing a distillation principle and relying upon solar energy.

It is another object of this invention to provide a device for the recovery of clear, fresh water from sea or brackish water which is simple to construct and operate and is relatively inexpensive.

It is another object of this invention to provide a device for the recovery of clear, fresh water from sea or brackish water which operates on a distillation principle and utilizes solar energy.

These and other objects of the invention will be more readily apparent from the following detailed description, with particular emphasis being placed upon the drawing.

The basic concept utilized in the recovery of fresh water from sea or brackish water according to the present invention depends upon the creation of a maximum surface area within a confined space through which sea water is passed, whereby the free air space over each surface layer of sea water is limited, thus concentrating the molecules of water vapor constantly being released from the sea water for recovery. In its simplest form, a device for producing clear, fresh water from saline water according to the present invention comprises a plurality of porous elements in closely spaced relationship. The device has a top having an entry tube for introducing the saline water and opening in the lower portion or bottom for exhaustion of excess saline water. In operation, the sea or brackish water is passed into the top of the device and filtered through the plurality of porous elements. In flowing through the plurality of porous elements, water is vaporized and, as a result of the minimum spacing, which is the essential feature of the invention, passes to the top of the container and is removed through suitable vapor exhaust tubes which are also located at the top of the device where condensation takes place forming fresh, usable water. The salt released as a result of the vaporization is washed through the device with the excess saline water and exhausted through the opening at the bottom of the device.

For purposes of more completely defining the invention and clarity of understanding the principles of operation, reference is made to the embodiment shown in the drawing, wherein FIGURE 1 is a front view of the device partly in section;

Figure 1:
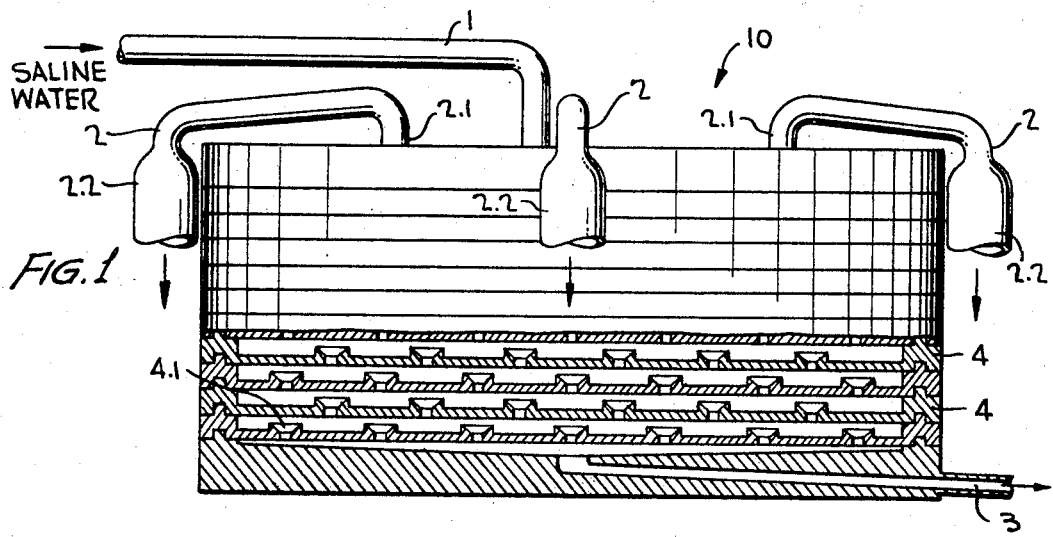
Figure 2:
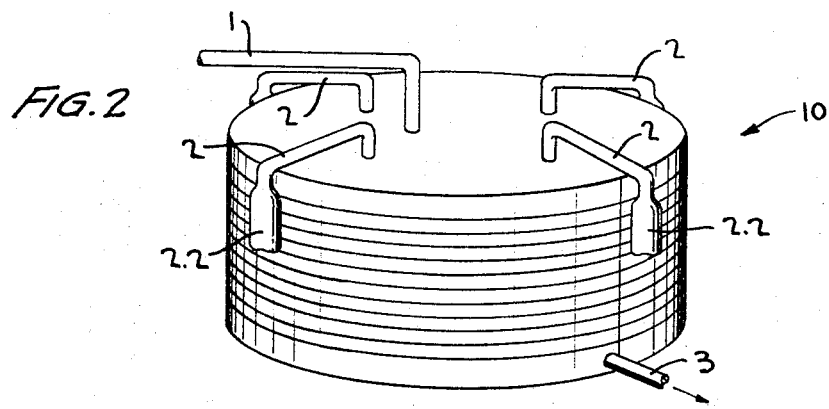
FIGURE 2 is a perspective view of the device shown in FIGURE 1.
Figure 3:
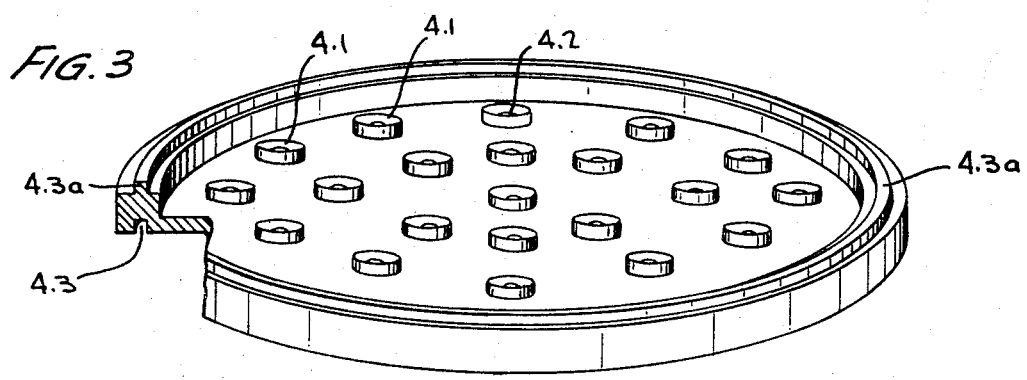
FIGURE 3 is a perspecitve view of the metal plates which are positioned within the device.

More specifically referring to the drawing, the device 10 has a saline water entry tube 1 and vapor exhaust tubes 2 at its top, and passage 3 at its base for exhaustion of surplus water. A plurality of replicated interlocking metal plates 4 are stacked to make up the body portion of the device. The interlocking plates have a plurality of openings 4.1. For convenience of illustration, the number of openings in the plates are greatly reduced in the drawing. Each opening has a lip 4.2 which extends approximately ⅛ of an inch above the surface of the plate. The plates are positioned in the device by means of slot 4.3 in one plate and key 4.3a in a matching plate, and together form the outer wall of the device. Each of the vapor exhaust tubes 2 which are strategically arranged around the top section of the device have a small opening at the point of egress 2.1 and then, after passing out through the top, slant downward and have an expanded portion 2.2 to permit condensation of the vapor.

In operation, the saline or brackish water is fed into the top of the device, which device remains in the closed condition throughout the water recovery cycle. Upon entering the device, the water flows downward by gravity filling the top plate with a thin layer of saline water approximately the depth of the lip at the porous openings, i.e., ⅛ of an inch in the device shown. After filling the top plate, the saline water overflows through the porous openings and commences to fill the next lower plate to the desired depth. As is apparent, the porous openings in the plates are randomly located so that the openings in two or more consecutive plates will not occur in a vertical line; or, preferably, complementary patterns are formed in the elements having slots and in the elements having the keys to provide the proper location of the openings. The aforesaid process continues successively until all plates within the device are covered with the required thin layer of saline water. As the saline water overflows the bottom plate, it is conducted out of the device through the saline water exhaust exit. The saline water flow into, throughout, and exiting from the surplus water exhaust exit is maintained at a constant rate sufficient to carry or flush the major portion of salt impurities away but yet not rapid enough to impair to any great extent the adsorption of solar heat energy transmitting from the surrounding external environment. Within the device, the flow of water molecules from the liquid state to the vapor state is greatly enhanced and accelerated through the rise in temperature of the thin layer of saline or brackish water since a maximum of surface area of water is available for heat transfer by conduction. The water vapor moves upwardly within the device through the many small openings provided in the plates and exits into the vapor exhaust tubes. The vapor tubes are constructed so as to provide a suitable condensation chamber for the vapor. The vapor, upon reaching the expanded portion of the exhaust tube, is cooled relative to the internal temperature of the device and condenses into liquid, fresh water. The fresh water is collected in a suitable tank or container as it exits from the exhaust tube.

The model shown in the drawing has a diameter of six feet and a height of six feet. A total of 330 plates spaced 1/16 inch apart between the surface of the water and the bottom of the plate above and having approximately 93 porous openings per plate surface will provide 9,332 square feet of surface area for transfer of water molecules from the liquid to the vapor state. The device, when located in an area having a temperature fluctuation of from about 65 to 95° F., during the daylight hours, will provide 720 gallons of water in a twelve-hour period. The flow of saline water through the device will be at a rate of approximately 80 gallons per hour.

As apparent, the size of the device as well as the number of porous elements retained therein can be varied substantially. The essential feature is to retain a large surface area for distribution of saline water and a minimal air space in the container. It has been found that the device preferably will comprise about 164 to 220 square feet of surface area per cubic foot of free air space.

The porous elements can be placed in a container which preferably will be constructed from a material which will readily adsorb and transfer heat, or they can collectively form the outer wall as shown in the drawing. Preferred materials for the porous elements and container are dull and opaque for maximum heat transfer. The material can be of metal, plastic, or a compressed substance as long as it will provide the necessary support and will not be detrimentally affected by salt water or water vapors. Metals and plastics are, therefore, preferred. The thickness of the plates is relatively immaterial as long as they will support the weight of the saline water which they are to carry. It may be desirable to have studs projecting from the plates which will provide rigidity and structural strength thereto. The number of openings in the plates is also subject to variation. It is necessary, however, that the number and width of the openings permit the passage of saline water downward and the passage of water vapor upward. Preferably, the plates will have from about 80 to 106 openings with a diameter of 1/8 of an inch (0.01 square inch), or 3/8 of an inch (0.12 square inch), or 0.04 square inch to 0.40 square inch per square foot of surface area. For the most efficient operation, it is necessary that a lip surround each porous opening. The height of the lip will vary depending upon the depth of the saline water desired to be retained on each plate. The depth is governed in part by the temperature of the environment in which the device is to be employed. Normally, the height of the lip will be 1/8 of an inch to 3/8 of an inch. The space between the plates again is subject to variation. However, it is desired that a minimum spacing exist between the plates in order to have the most efficient vaporization of water from the saline solution and passage thereof to the vapor exhaust tubes. The plates are constructed to permit convenient positioning in order that the device can be removed and washed periodically to prevent corrosion.

The saline water can be supplied to the device by suitable means such as siphoning, pumping, and the like. The rate of flow will be governed in order to remove most of the salt formed as a result of vaporization of water, but yet will not be so fast as to detrimentally disturb the heat adsorption and the retention of the heat within the device. Normally, the flow will be from about 1.3 gallons to 2.0 gallons per hour per cubic foot of air space in the container. The optimum flow is about 1.6 gallons per cubic foot air space in the container.

The exhaust tubes are constructed so as to deflect below the horizontal upon emerging from the top of the device. At a point beyond the deflection, the tube is spiraled or coiled and is slightly expanded in order to permit a greater surface for dissipation of heat energy and consequent condensation of the water vapor. The tubes may be finned or spiraled in order to provide a greater surface area.

As will be apparent from the aforegoing, numerous modifications can be made in the device for carrying out the present invention with the essential feature being the creation of large surface areas available for carrying saline water in a container having a minimum of free air space. Modifications of the invention in light of the aforesaid teaching will be readily apparent to those skilled in the art and are to be considered within the spirit and scope of the present invention.

It is claimed:

1. An apparatus for the recovery of fresh, usable water from saline water comprising a closed container adapted to be heated by solar energy, the top portion of said container having a centrally located entry passage for saline water and a plurality of circumferentially spaced vapor exhaust tubes having a downwardly disposed expanded section communicating with said top portion; a base portion having a water exit passage; a plurality of porous replicated plates interlocked by matching portions of adjacent plates which form the outer wall portion of the apparatus, the openings in said porous plates each having a raised lip around said openings, providing a large surface area for retaining saline water and forming a tortuous path for the flow of water from said entry passage to said exit passage.

2. The apparatus of claim 1, wherein the replicated plates are metal.

3. The apparatus of claim 2 wherein the replicated plates are circular.

4. The apparatus of claim 3 wherein the total surface area of said replicated plates is from 164 to 220 square feet per cubic foot of total air space within said container.

References Cited

UNITED STATES PATENTS

| | | | |
|---|---|---|---|
| 1,886,957 | 11/1932 | Huff | 261—114 X |
| 1,996,526 | 4/1935 | Serpas | 159—18 X |
| 2,210,926 | 8/1940 | Hickman | 203—89 |
| 3,129,145 | 4/1964 | Hassler | 202—153 X |
| 3,298,932 | 1/1967 | Bauer | 202—174 X |
| 3,304,242 | 2/1967 | Lockman | 159—18 X |
| 3,317,406 | 5/1967 | Beard | 203—10 X |

FOREIGN PATENTS

| | | |
|---|---|---|
| 290,553 | 5/1928 | Great Britain. |
| 720,921 | 12/1954 | Great Britain. |

NORMAN YUDKOFF, *Primary Examiner.*

F. E. DRUMMOND, *Assistant Examiner.*

U.S. Cl. X.R.

202—234, 236; 203—10